(12) United States Patent
Calder et al.

(10) Patent No.: US 8,019,979 B2
(45) Date of Patent: Sep. 13, 2011

(54) EFFICIENT IMPLEMENTATION OF BRANCH INTENSIVE ALGORITHMS IN VLIW AND SUPERSCALAR PROCESSORS

(75) Inventors: Jeffrey W. Calder, Kingston (CA); Tong Sun, Mississauga (CA)

(73) Assignee: Sigma Designs, Inc., Milpitas, CA (US)

( * ) Notice: Subject to any disclaimer, the term of this patent is extended or adjusted under 35 U.S.C. 154(b) by 922 days.

(21) Appl. No.: 11/854,003

(22) Filed: Sep. 12, 2007

(65) Prior Publication Data
US 2009/0070567 A1     Mar. 12, 2009

(51) Int. Cl.
G06F 9/34      (2006.01)
G06F 9/40      (2006.01)
(52) U.S. Cl. ....................... 712/233; 712/236
(58) Field of Classification Search .................. 712/233, 712/236
See application file for complete search history.

(56) References Cited

U.S. PATENT DOCUMENTS

| | | | | |
|---|---|---|---|---|
| 4,833,599 A * | 5/1989 | Colwell et al. | ................ | 712/236 |
| 5,471,593 A * | 11/1995 | Branigin | ....................... | 712/235 |
| 2003/0217248 A1* | 11/2003 | Nohl et al. | .................... | 712/208 |
| 2006/0103659 A1* | 5/2006 | Karandikar et al. | .......... | 345/558 |

* cited by examiner

*Primary Examiner* — Daniel Pan
(74) *Attorney, Agent, or Firm* — Jones Day

(57) ABSTRACT

An apparatus for implementing branch intensive algorithms is disclosed. The apparatus includes a processor containing a plurality of ALUs and a plurality of result registers. Each result register has a guard input which allows the ALU to write a result to the register upon receipt of a selection signal at the guard input. A lookup table is dynamically programmed with logic to implement an upcoming branching portion of program code. Upon evaluation of the branch conditions of the branching portion of code, the lookup table outputs a selection signal for writing the correct results of the branching portion of code based on the evaluation of the branch condition statements and the truth table programmed into the lookup table to the result register.

15 Claims, 10 Drawing Sheets

| INDEX | | | LUT | | | |
|---|---|---|---|---|---|---|
| BR0 $a<b$ | BR1 $c==c$ | BR2 $e>f$ | R0 = !BR0 & !BR2 Guards (w=s−t) | R1 = !BR0 & BR2 Guards (w=y−z) | R2 = BR0 & !BR1 Guards (w=s+t) | R3 = BR0 & BR1 Guards (w=y+z) |
| 0 | d | 0 | 1 | 0 | 0 | 0 |
| 0 | d | 1 | 0 | 1 | 0 | 0 |
| 1 | 0 | d | 0 | 0 | 1 | 0 |
| 1 | 1 | d | 0 | 0 | 0 | 1 |

*Fig. 10*

EFFICIENT IMPLEMENTATION OF BRANCH INTENSIVE ALGORITHMS IN VLIW AND SUPERSCALAR PROCESSORS

BACKGROUND

1. Field of the Invention

The technology described in this patent application relates generally to superscalar and VLIW processing optimization, and in particular to the use of programmed logic to assist branch efficiency in superscaler processors.

2. Related Art

Many embedded applications, especially in video compression, require continual iterations of decision trees. The processing of decision trees is often inefficient because it is not possible to know which instruction branch will be taken until the branch conditions are evaluated. This uncertainty prevents multi-stage pipeline processors from fully realizing the increased efficiencies of their design because the pipeline must be flushed if the correct instructions are not following the branch instruction, and the correct instructions can not be determined until the branch instruction is evaluated.

Existing solutions for aiding the efficiency of branch processing include software predictive branch algorithms as well as utilization of dedicated hardware. In some cases predictive branching is effective in alleviating the problem. However, if the prediction is poor or the branches are equally likely and frequent, there is only so much that can be gained and efficiency remains low. Dedicated hardware solutions are very efficient in aiding efficiency when the structure and branching conditions are known prior to runtime. However, for branch intensive algorithms, where branch conditions are not constant or are too numerous to devote hardware to for each set, a dedicated hardware solution may be inappropriate.

SUMMARY

An apparatus for implementing branch intensive algorithm is disclosed that comprises a Very Long Instruction Word (VLIW) processor, the VLIW processor comprising a plurality of Arithmetic Logic Units (ALUs) and a plurality of results registers having guard inputs, wherein the guard inputs are responsive to a selection signal enabling the ALU to write the proper result to a result register. The apparatus further comprises a lookup table dynamically programmed with logic to implement a plurality of upcoming logic equations, wherein the lookup table outputs the selection signal based upon outputs from the ALUs and the programmed logic for implementing the upcoming logic equations.

A method of efficiently processing a branch intensive algorithm is also disclosed that comprises the steps of configuring a lookup table with a truth table for an identified branching portion, processing conditional statements of the identified branching portions in separate execution units of a VLIW processor, providing the outcomes of the conditional statement processing to the lookup table, processing the possible results of the identified branching portion in separate execution units of a VLIW processor, generating a selection signal from the lookup table based upon the configured truth table and the outcomes of the conditional statement processing, providing the outputs of the ALUs to guarded result registers, enabling the result to be written into the results register, and configuring the lookup table with an appropriate truth table for the next identified branching portion.

An apparatus for efficiently implementing audio, video, and graphic processing algorithms involving intense decision making is also provided. The apparatus includes a Very Long Instruction Word (VLIW) processor, the VLIW processor comprising a plurality of Arithmetic Logic Units (ALUs) and a plurality of results registers having guard inputs, wherein the guard inputs are responsive to a selection signal enabling the ALUs to write the proper results to the result registers. The apparatus further comprises a register file for storing outputs from the plurality of ALUs and a lookup table dynamically programmed with logic to implement a plurality of upcoming logic equations, wherein the lookup table outputs a selection signal based upon outputs from the plurality of ALUs and the programmed logic for implementing a plurality of upcoming logic equations.

A method of efficiently implementing a branch algorithm is further provided that comprises configuring a lookup table during runtime for a branch algorithm, computing the branch conditions of the branching algorithm, computing outcome calculations for the branching algorithm, and utilizing the computed branch conditions and the configured lookup table to select the correct outcome calculation result.

BRIEF DESCRIPTION OF THE DRAWINGS

FIG. 10 is a truth table for implementing an example branching algorithm.

DETAILED DESCRIPTION

Figure 1:
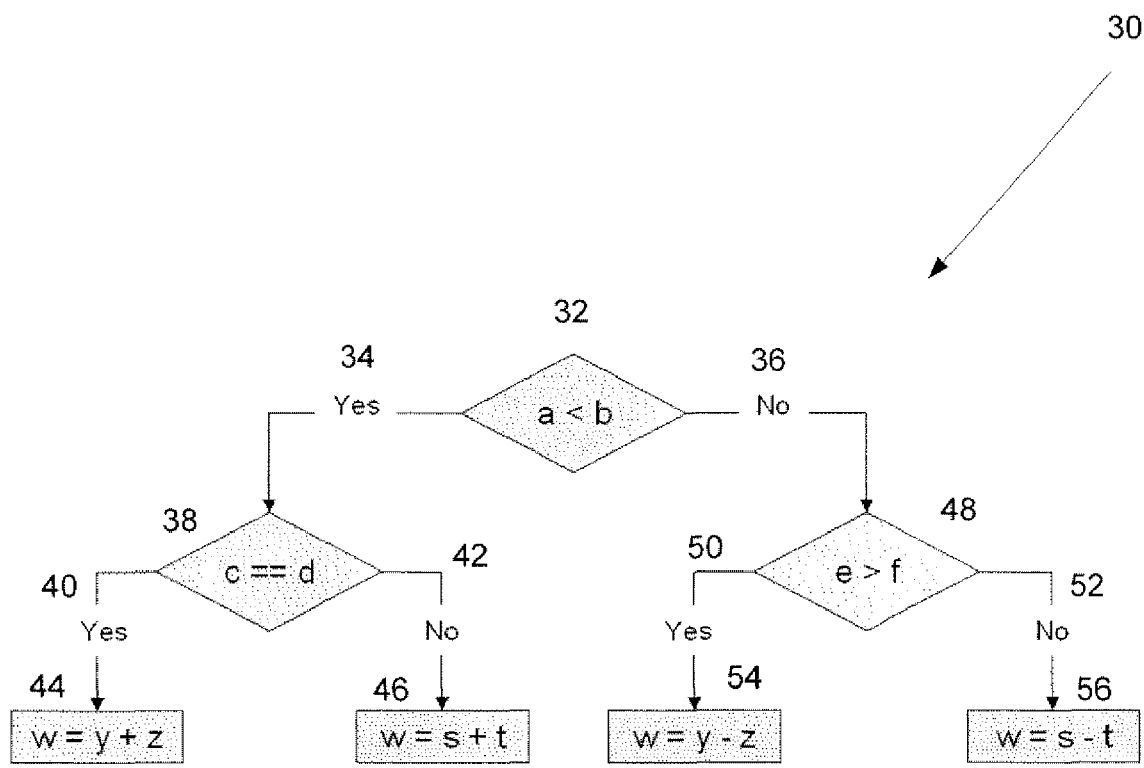
FIG. 1 shows a depiction of an example branching algorithm.

Systems and methods of efficient implementation of branch intensive algorithms are disclosed herein. The goal of these systems and methods is to implement a branching structure similar to that disclosed in FIG. 1 in a quick and efficient manner and to be able to accomplish this repeatedly with possibly changing branch criteria. Many embedded applications, especially in video compression, require repeated iteration of decision trees like that shown in FIG. 1. Examples of these applications include JPEG2000, VC-3, VC-2, MC-FRC, De-Interlacing, Noise Reduction, and Detail Enhancement. Note that in FIG. 1, only one instruction is executed at the end of each branch. This depiction is solely for explanation. The disclosed implementation is suitable for as many instructions as are necessary at the bottom of each branch. Additionally, the branch algorithm depicted in FIG. 1 is two-tiered. However, the disclosed implementation is fully capable of being scaled to process smaller or larger branching structures as required, and the depiction of a two-tiered branching structure is for illustration purposes only.

As illustrated in FIG. 1, a two-tiered decision branch algorithm 30 consists of a first level branch criterion 32 along with a 'yes' branch 34 and a 'no' branch 36. If 'a' is less than 'b,' then the 'yes' branch 34 is taken and the algorithm proceeds to a second level branch criterion (a) 38. If 'a' is not less than 'b,' then the 'no' branch 36 is taken and the algorithm proceeds to a second level branch criterion (b) 48. If branch criterion 38 is reached following 'yes' branch 34, the branch criterion 'c==d' is evaluated. If this statement is true, then the 'yes' branch 40 is taken, and the proper result, 'y+z' is stored in 'w' 44. If 'c==d' is not true, then 'no' branch 42 is taken, and 's+t' is stored in 'w' 46 If branch criterion 48 is reached following 'no' branch 36, the branch criterion 'e>f' is evaluated. If this statement is true, then the 'yes' branch 50 is taken, and the proper result, 'y−z' is stored in 'w' 54. If 'e>f' is not true, then 'no' branch 52 is taken, and 's−t' is stored in 'w' 56. One way of representing this branching sequence is through assembly code as follows:

```
loop:
  sub b, a         //a−b
  blt label1       //branch if a−b<0 or a < b   pipeline flushed here
  sub e, f         //e−f
  bgt label2       //branch if e−f>0 or e > f   pipeline flushed here
  sub s, t         //s−t stored in accumulator
  branch loop      //branch back to start
label2:
  sub y, z         //y−z stored in accumulator
  branch loop      //branch back to start
label1:
  sub c, d         //c−d
  beq label3       //branch if c−d=0 or c=d pipeline flushed here
  add s, t         //s+t stored in accumulator
  branch loop      //branch back to start
label3:
  add y, z         //y+z stored in accumulator
  branch loop      //branch back to start
```

Figure 2:
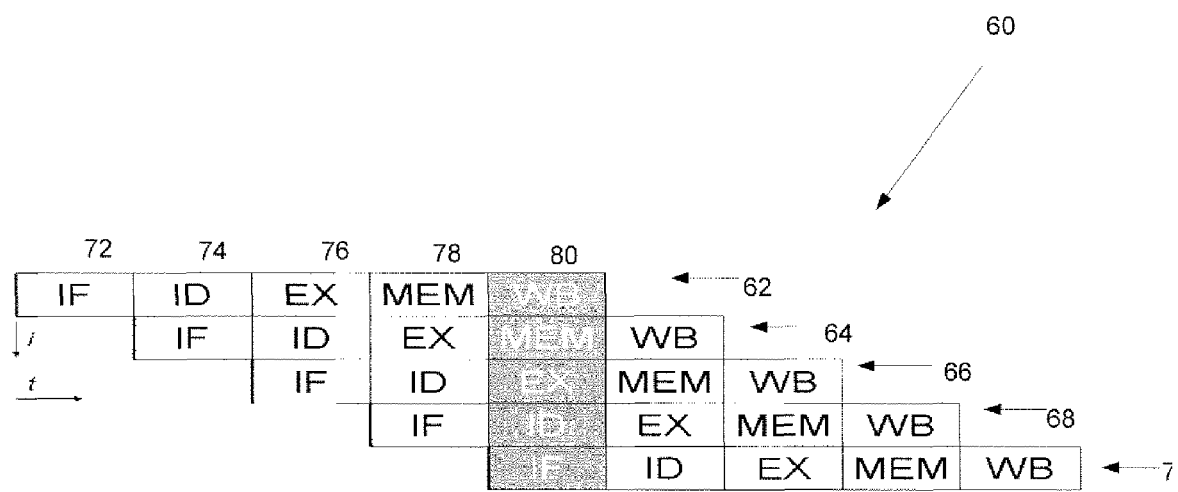
FIG. 2 shows a five stage instruction pipeline.

One possible method of implementation of the branching algorithm shown in FIG. 1 is through straight processing in a pipelined processor. Such a processor arrangement 60 is depicted in FIG. 2. Pipelining assumes that successive instructions in a program sequence will overlap in execution as suggested by FIG. 2. By breaking an instruction 62 down into stages, such as 'instruction fetch' (IF) 72, 'instruction decode' (ID) 74, 'execute' (EX) 76, 'memory access' (MEM) 78, and 'register write back' (WB) 80, different portions of the processor that specialize in each of these stages can operate on different instructions simultaneously to improve efficiency. Thus, while the register write back portion of the processor handles instruction 62, the memory access portion handles instruction 64, the execute portion handles instruction 66, the instruction decode portion handles instruction 68, and the instruction fetch portion handles instruction 70. This architecture improves efficiency because it reduces idle time of processor components.

However, processors with instruction pipelines struggle with efficient handling of branch instructions. These processors are typically forced to flush the pipeline every time a branch instruction is executed because the branch destination is not known until after the execution stage.

Figure 3:
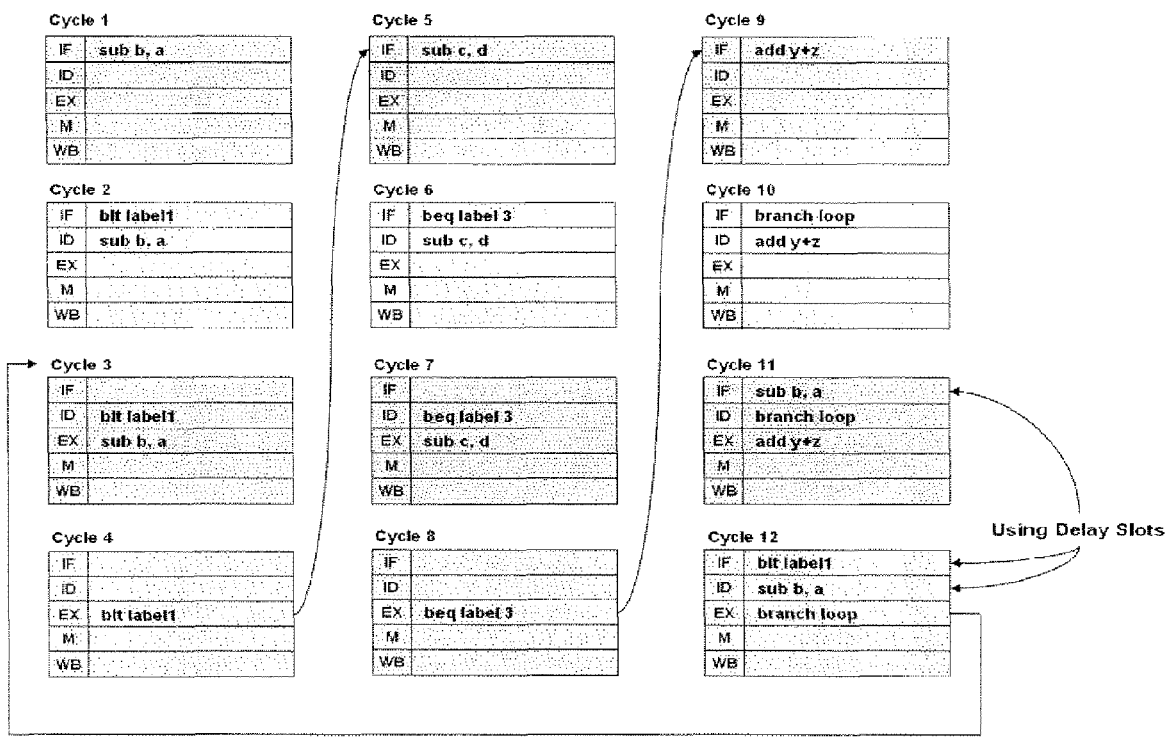
FIG. 3 shows a prior art processing of a branching algorithm.

This is illustrated in FIG. 3 which depicts a 5-stage pipelined processor computing the sample branching algorithm of FIG. 1. For this iteration, 'a' is less than 'b' and 'c' is equal to 'd.' Cycle 1 fetches the instruction to subtract 'b' minus 'a,' 'sub b, a.' Cycle 2 decodes 'sub b, a' and fetches the branch if less than to label1 instruction, 'blt label1.' Cycle 3 executes the subtraction instruction, 'sub b, a,' and cycle 4 executes the branch instruction, 'blt label1.' Notice that the instruction fetch and instruction decode stages of the processor are idle because it is unknown which path of the branching algorithm will be taken until the branch instruction is executed.

Thus, no execution is occurring during cycles 5 and 6. Once the second comparison is fetched and decoded during cycles 5 and 6, execution continues in cycle 7 with the subtraction of 'c' minus 'd.' Because 'c' and 'd' are equal, the branch executed in cycle 8 proceeds to label 3 which will insert the correct value, 's+t' into register 'w.' However, notice that execution is again unable to occur during cycles 9 and 10 because it was unknown which branch would be processed prior to execution of the compare and branch instruction. Cycles 9 and 10 fetch and decode the instruction to load register 'w' with 'y+z' and cycle 10 fetches the instruction to loop back to the beginning of the branch processing. If the branching is going to be repeated, the instructions loaded in cycles 1 and 2 can be fetched and decoded following the 'branch loop' instruction in cycles 11 and 12. This makes the entire branch traversal a 10 cycle process. Unfortunately, only 3 of the cycles are useful ALU operations because of the dependencies between cycles 4 and 5 and cycles 8 and 9. The other 7 cycles are taken up by flushing the pipeline or branch statements. This is only a 30% efficiency.

This low efficiency could in some cases be improved by predictive branching. Predictive branching is designed to try to alleviate this problem by utilizing an algorithm to guess which branch will be taken and to prime the fetch and decode stages with instructions for those branches. In some cases, predictive branching is very effective. However, if the prediction is poor or the branches are equally likely and frequent, there is only so much that can be gained and efficiency remains low.

A slightly more efficient method of processing branch algorithms is through the use of parallel execution units in VLIW or superscalar processors. In VLIW processing, one VLIW instruction encodes multiple operations; specifically, one instruction encodes at least one operation for each execution unit of the device. For example, if a VLIW device has five execution units, then a VLIW instruction for that device would have five operation fields, each field specifying what operation should be done on that corresponding execution unit. To accommodate these operation fields, VLIW instructions are usually at least 64 bits in width, and on some architectures are much wider.

An efficient implementation on a standard VLIW processor with a 5-stage instruction pipeline would likely not include any branch statements. Because of the amount of resources available each cycle in a VLIW processor, any cycles wasted flushing the pipeline is a very inefficient use of resources. An efficient implementation on a VLIW processor would be done with conditional execution of instructions that are available on most VLIW processors. Assembly code for this implementation would be as follows:

```
//Cycle 1:
{
  reg0 = a < b;
  reg1 = c == d;
  reg2 = e > f;
}
//Cycle 2:
{
  reg3 = ~ reg0;
  reg4 = ~ reg1;
  reg5 = ~ reg2;
}
Cycle 3:
{
  reg0 = reg0 & reg1
  reg1 = reg0 & reg4
```

```
        reg2 = reg3 & reg2
        reg3 = reg3 & reg5
    }
    Cycle 4:
    {
        [reg0] reg6 = y +z;    // will be executed when reg0 == 1
        [reg1] reg6 = s + t;   // will be executed when reg1 == 1
        [reg2] reg6 = y − z;   // will be executed when reg2 == 1
        [reg3] reg6 = s − t;   // will be executed when reg3 == 1
    }
```

As shown in the assembly code, the branch conditions (32, 38, and 48 from FIG. 1) are computed in cycle 1. Cycle 2 computes the inverses of the calculations in cycle 1. Cycle 3 computes which branch the values of 'a,' 'b,' 'c,' 'd,' 'e,' and 'f,' dictate should be taken and cycle 4 loads register 6 with the proper calculation dictated by that branch. This implementation can be accomplished in 4 cycles and requires a large number of registers.

Figure 4:
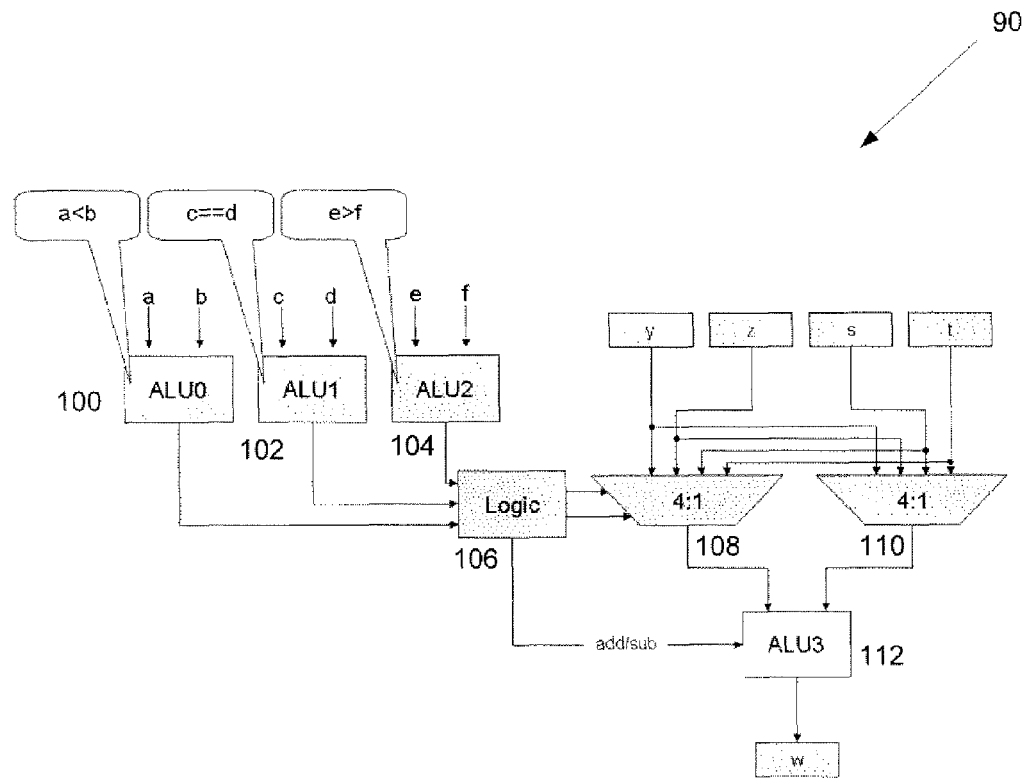
FIG. 4 shows a prior art dedicated hardware processing aid.

Another method of solving a branch algorithm is depicted as prior art in FIG. 4. In this embodiment, the branching conditions are calculated using separate ALUs (100, 102, and 104). The outcome of these calculations is made available to dedicated logic 106. Based upon the logic held in dedicated logic 106 and the branch condition outcomes from the ALUs (100, 102, and 104), the dedicated logic 106 outputs control signals to multiplexers 108 and 110 as well as a signal to ALU3 112 instructing it to add or subtract. The control signals to the multiplexers (108, 110) from the dedicated logic 106 control which operands are passed to ALU3 112. Once ALU3 receives operands from the multiplexers (108, 110) and a control signal telling whether to add or subtract, ALU3 is then capable of providing the correct value to register 'w,' This process could be accomplished in 2 processor cycles. The first cycle calculates the branching conditions in the first three ALUs (100, 102, and 104), and the second cycle calculates the correct value and passes it to register 'w' in ALU3 112. While this use of dedicated hardware allows for high speed processing, it suffers a weakness in that the dedicated logic 106 is only good for one branching instruction set. Thus, if there were a large number of branching instruction sets, or the exact criteria for which branching instruction sets are going to be evaluated is unknown before runtime (due to user interaction, properties of the data, etc.), a dedicated logic solution becomes impractical or unusable.

Figure 5:
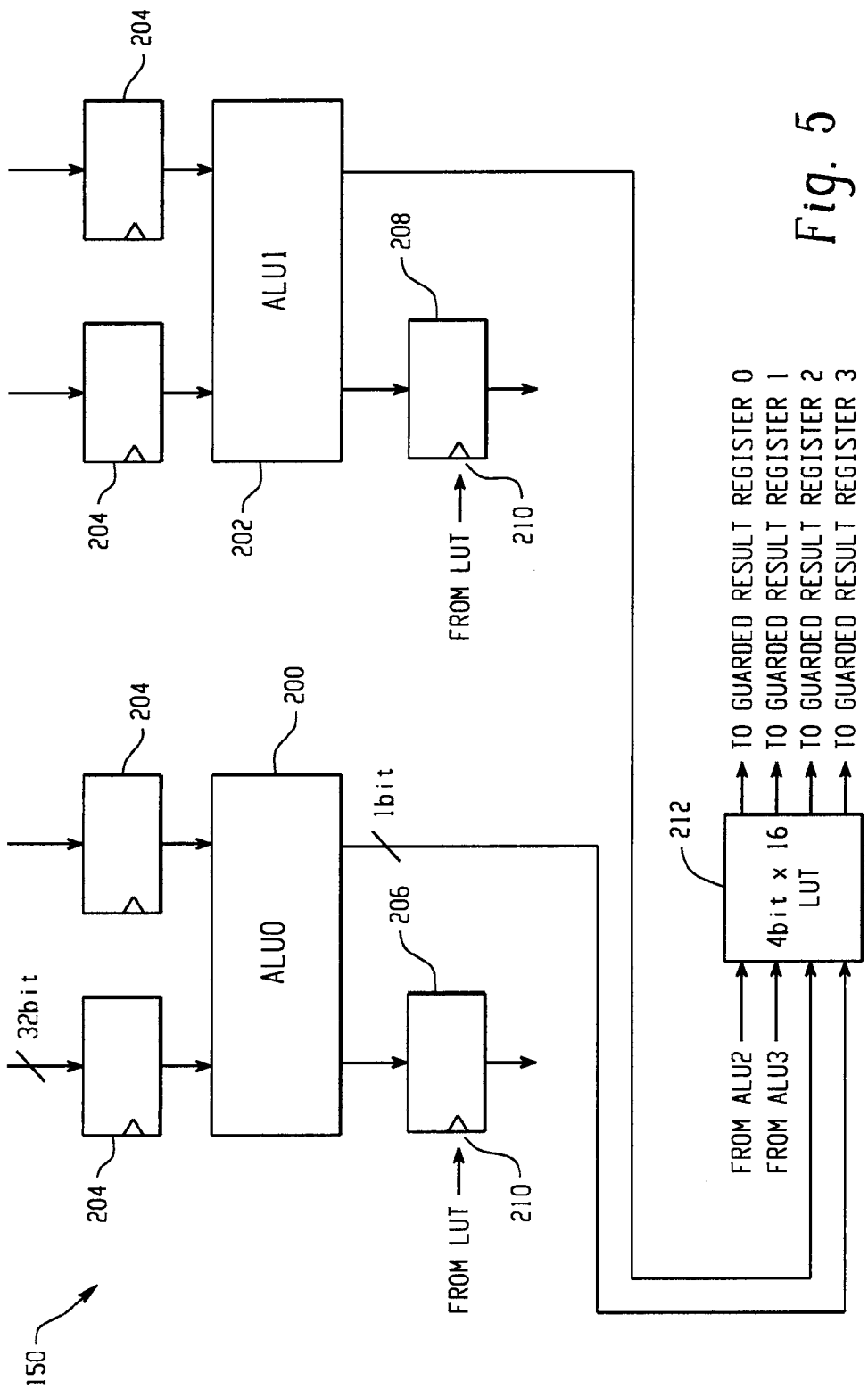
FIG. 5 shows an example dynamically programmable lookup table for aiding branch algorithm processing.

FIG. 5 shows an example dynamically programmable lookup table for aiding branch algorithm processing. The approach depicted in FIG. 5, as well as the remaining FIGS. 6-10, blends the speed of hardware solutions with the flexibility of software solutions. For purposes of clarity and readability, like parts will retain their reference numbers throughout FIG. 5 through FIG. 8.

FIG. 5 depicts two ALUs (200, 202, etc.) being fed by operand registers 204. Responsive to the output of the ALUs are guarded results registers. (206, 208, etc.) These guarded results registers are capable of storing results calculated by the ALU to which it is responsive. Additionally, guarded results registers (206, 208, etc.) contain a 'guard input' 210. This guard input 210 allows writing to the register upon validation by an active signal on the guarded results register's guard input 210. This feature of the guarded results register allows the processor to compute all of the possible results (e.g., w=y+z, w=s+t, etc. from FIG. 1) in parallel using its plurality of ALUs (200, 202, etc.) and then write the results to a guarded results register when a selection signal identifies the correct result to be propagated. A variation on the use of the guarded results register would allow writing the results of all possible results to the guarded results registers, but would only permit writing of the correct result to a register file, memory or some other location for further processing following assertion of that guarded results registers guard input by a selection signal.

Also responsive to at least 1 bit from the ALUs (200, 202, etc.) is a lookup table 212. When an upcoming branching portion of code in a program is identified, the lookup table is programmed to contain a truth table, such as that depicted in FIG. 10. The truth table of FIG. 10 solves the set of branching instructions depicted as an example in FIG. 1. Upon receipt of signals from the ALUs (200, 202, etc.) following a first cycle calculation of the branching conditional statements, lookup table 212 outputs a selection signal on one of its output lines based on those inputs from the ALUs (200, 202, etc.) and the truth table programmed to implement the branching portion. The selection signal will be active for the lookup table output corresponding to the guarded results register containing the correct result for the branching portion. This active selection signal from the lookup table to the guard input 210 allows the proper results data to be written to the guarded results register. The other outputs of the lookup table would remain inactive preventing writing of the other results to the guarded results registers.

It should be noted that any number of ALUs or functional units could be utilized in this example. FIG. 5 only depicts 2 ALUs. However, this is only for illustrative purposes. As can be seen by the inputs to lookup table 210, a 4 bit×16 lookup table is capable of handling inputs from up to 4 sources, such as ALUs, and outputting up to 16 different selection signals Although only two ALUs are shown in FIG. 5 and the figures that follow, any number of ALUs could be supported in this example and the examples that follow.

Figure 6:
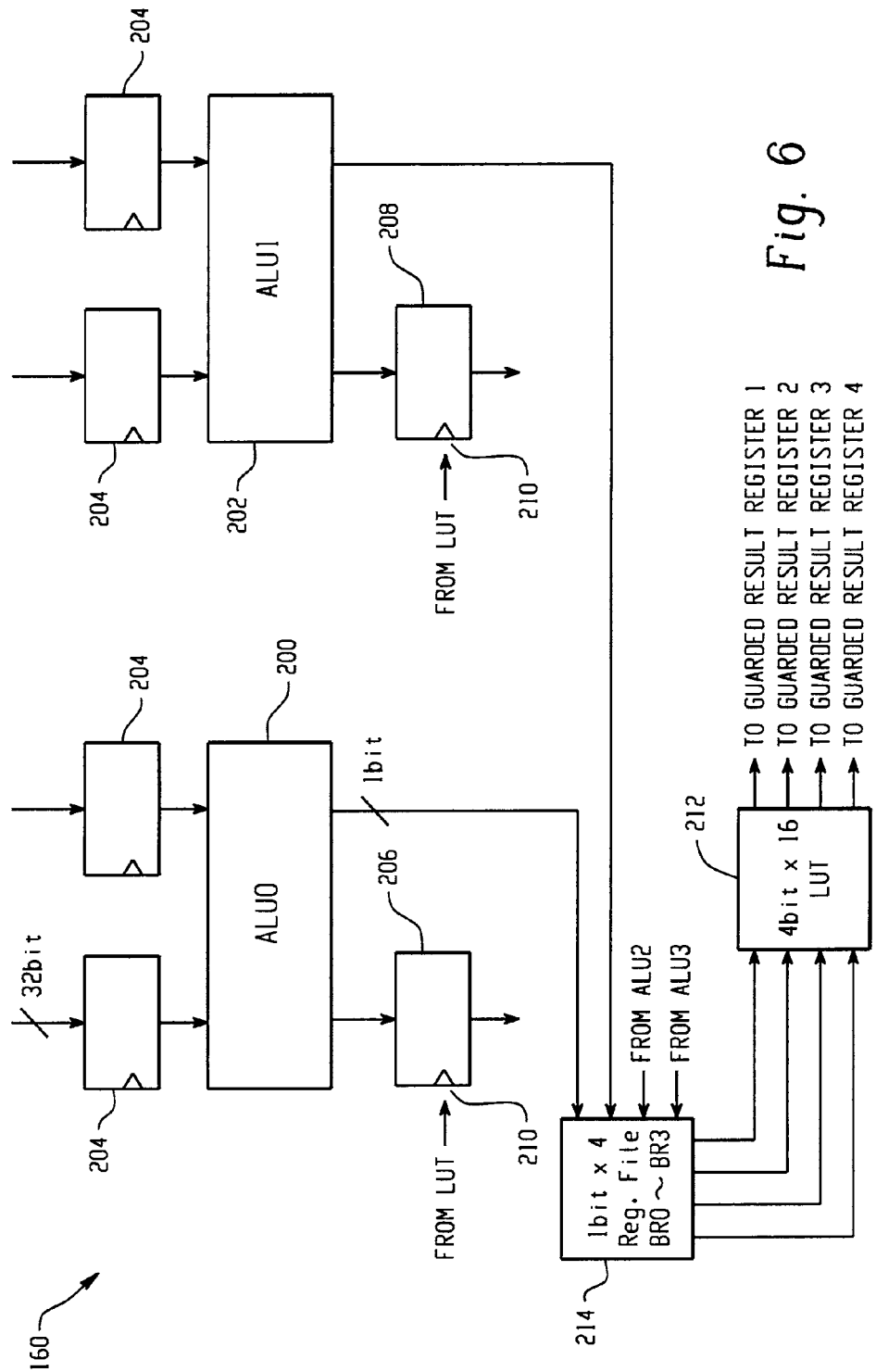
FIG. 6 shows an example register file for storing branch outcomes prior to lookup table activation.

FIG. 6 shows an example register file for storing branch outcomes prior to lookup table activation. FIG. 6 introduces a 1 bit×4 register file 214 between the set of ALUs (200, 202, etc.) and lookup table 212. Register file 214 is useful in situations where synchronization among ALUs (200, 202, etc.), the lookup table 212, and the guarded results registers (206, 208, etc.) is an issue. If the lookup table 212 is not immediately ready for the results of the branch condition processing at the time the ALUs (200, 202, etc.) have completed that processing, register file 214 is a convenient storage medium for the branch condition processing results. Additionally, if the guarded results registers (206, 208, etc.) have not yet received the results of the branch outcomes processing when the lookup table 212 is ready to validate one of the registers based upon the branch condition processing results and the truth table, register file 214 is again a convenient storage medium for the branch condition processing results until the guarded results registers (206, 208, etc.) have received the proper branch outcomes processing results. The timing of the selection/validation signal from the lookup table 212 could be important in this situation because validation of a guarded results register (206, 208, etc.) before the branch outcomes have been calculated could result in an unstable or erroneous program state.

Figure 7:
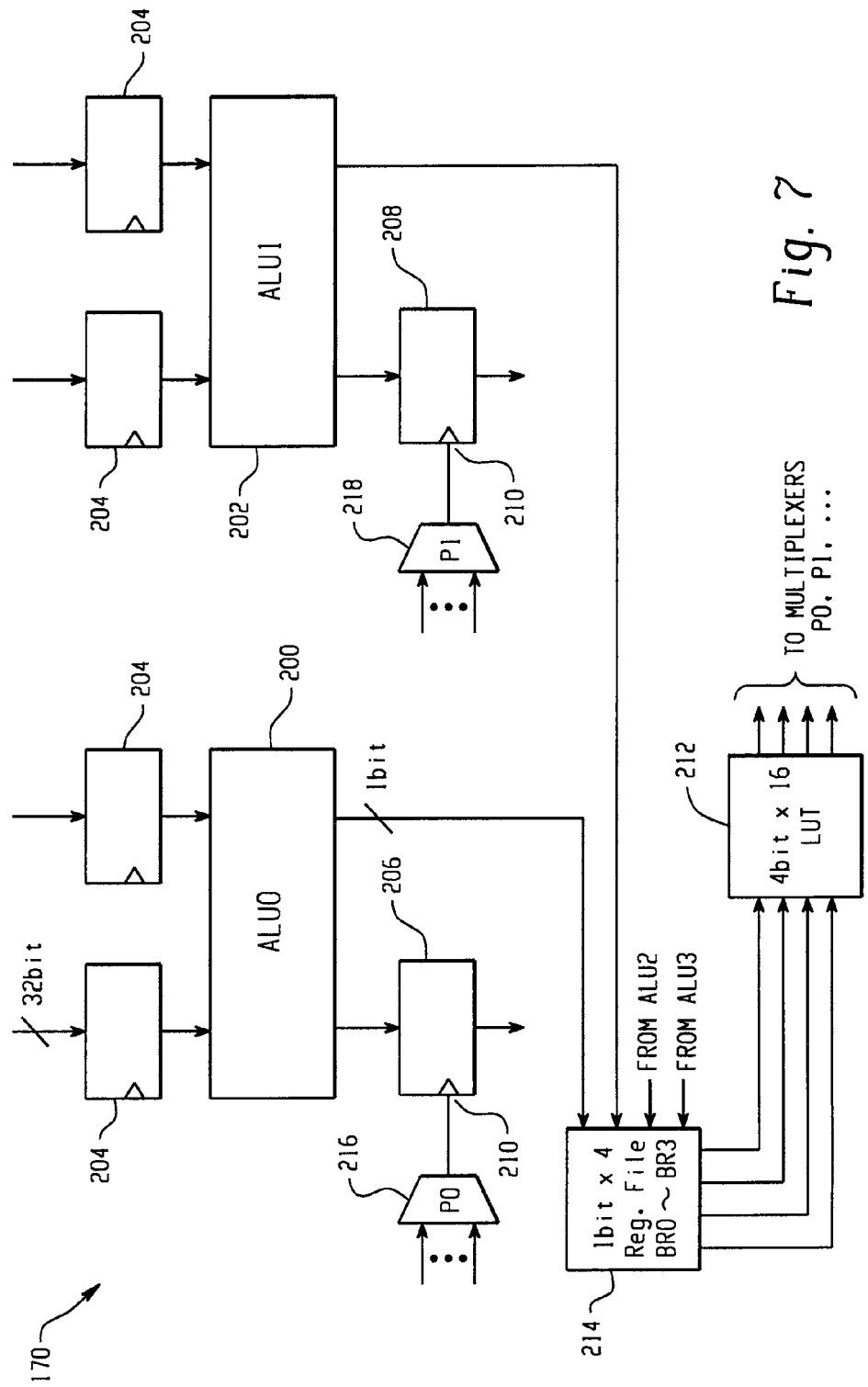
FIG. 7 shows example multiplexers for mapping lookup table outputs to guard inputs on result registers.

FIG. 7 shows example multiplexers for mapping lookup table outputs to guard inputs on result registers. The addition of these multiplexers (216, 218, etc.) enables the outputs of lookup table 212 to be accessible to all of the guarded results registers (206, 208, etc.). This feature removes any prior constraints of individual lookup table 212 outputs being connected to single guarded results registers (206, 208, etc.). The mapping of lookup table 212 outputs to guarded results registers (206, 208, etc.) through the multiplexers' (216, 218, etc.) input selection could be done near the time when an upcoming branching portion of code is identified and the lookup table is programmed, or prior to run time, by the compiler, or programmer. This mapping capability increases flexibility in design of truth tables like that depicted in FIG. 10 which could result in higher efficiencies when truth tables are calculated during runtime by the processor.

Figure 8:
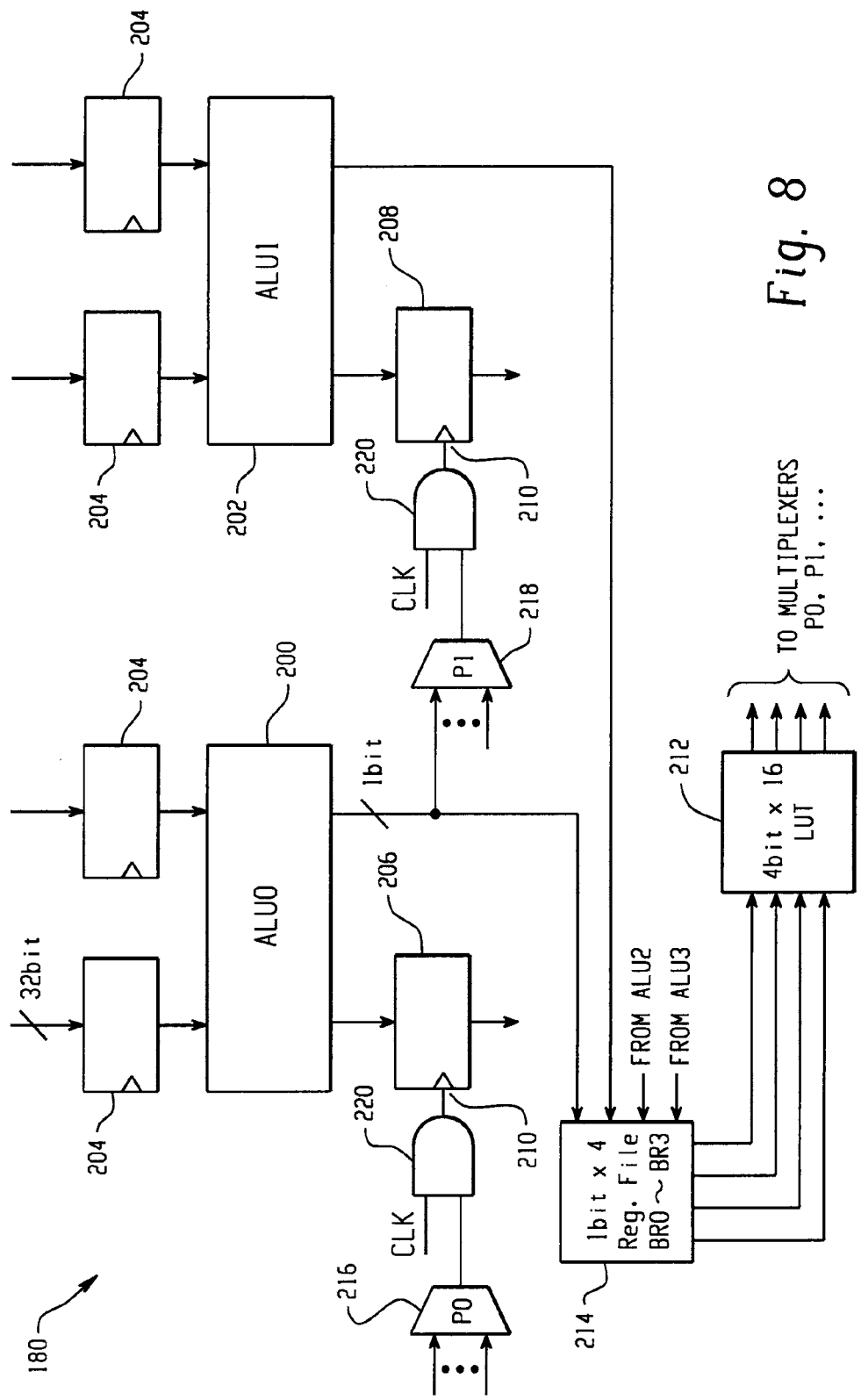
FIG. 8 shows example 'and' gates utilized for timing purposes among the lookup table, multiplexers, and guarded result registers.

FIG. 8 shows example 'and' gates utilized for timing purposes among the lookup table, multiplexers and guarded result registers. This example includes a plurality of 'and' gates 220 for aid in synchronization between the lookup table 212 and the guarded results registers (206, 208, etc.). This synchronization may be necessary in cases where the selection signal must be applied to the guard inputs 210 during a certain period of a clock cycle. Thus, once a validation output is output from the lookup table 212 and mapped to the appropriate guarded results register (206, 208, etc.) by the multiplexers (216, 218, etc.), it will then be applied to the guarded results register (206, 208, etc.) in synchronization with the clock pulse.

Figure 9:
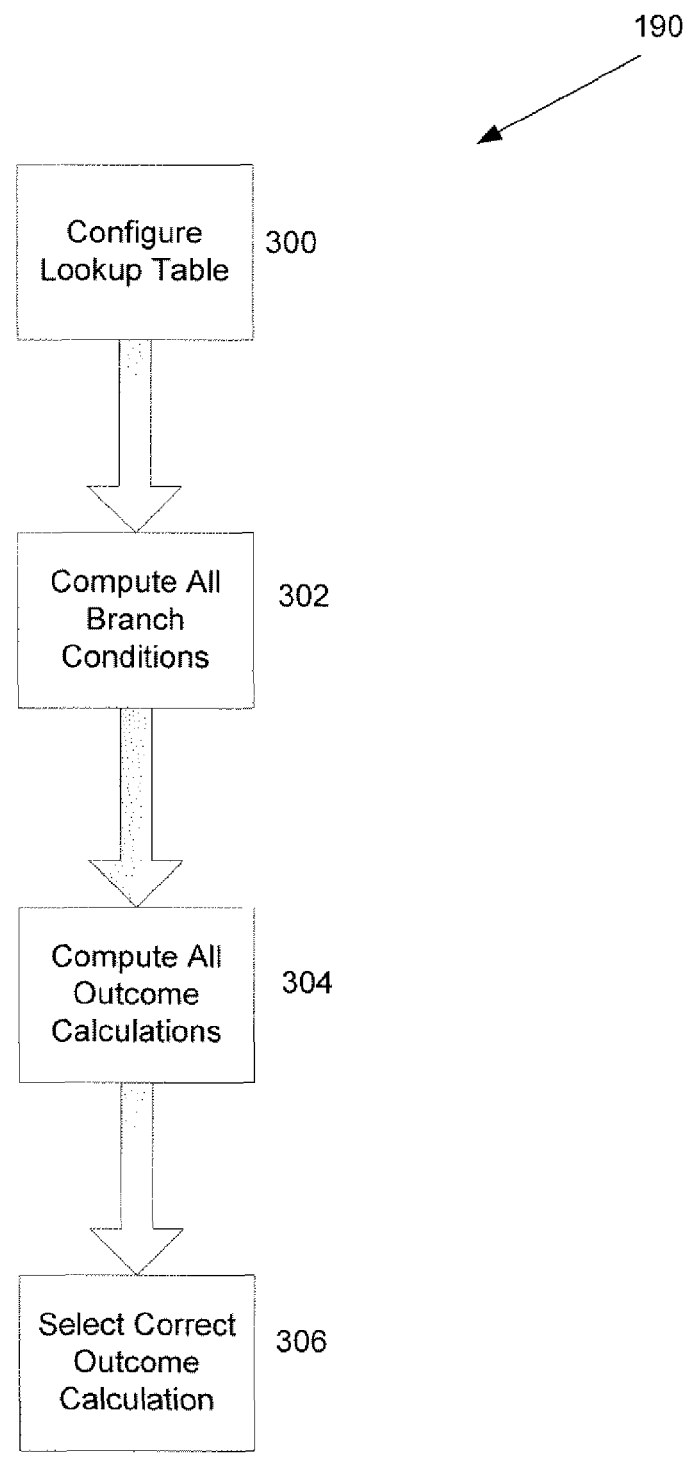
FIG. 9 is an example flow diagram of a method of efficient branch processing.

FIG. 9 depicts a flow diagram of an example method of efficient branch processing. Step 300 configures the lookup table for an identified upcoming branching portion of executing program code. To configure the lookup table, a truth table such as that depicted in FIG. 10 is created to manage all possible results of the upcoming branching portion. Because the exact criteria of identified branching portions are often not known until during runtime due to variables such as user input, characteristics of data to be processed, etc., the truth table will often need to be created during runtime by the processor using look ahead capabilities of the processor or through compiler optimizations. Once an appropriate truth table is ready, preferably before the time of processing the identifying branching portion, the truth table is loaded into the lookup table. Once the lookup table has been configured, a computation of all branching conditions 302 occurs. Optimally, all of these branching conditions are processed in parallel simultaneously in the plurality of ALUs present in the VLIW processor during a single processor cycle.

The outcomes of the processing of the branching conditions are passed to the lookup table. Preferably, during the clock cycle following the computation of all of the branching conditions, the processor computes all outcome conditions. Optimally, this is done in parallel, simultaneously utilizing the plurality of ALUs. This step processes each of the calculations necessary to implement each final branch of the identified branching portion (e.g., w=y+z; w=s+t; w=y−z; w=s−t in FIG. 1) in one clock cycle.

In step 306, the lookup table utilizing its configured truth table along with the outcomes of the branch condition calculation outputs a selection signal validating the outcome condition at the correct guarded result register. This validated result is then permitted to propagate as the correct result for the identified branching portion of code.

To further illustrate the function of the disclosed systems and methods, the following description of processing the example branching portion depicted in FIG. 1 is discussed. This example should be treated as non-limiting and solely to aid in the understanding of the disclosure to one skilled in the art.

The example systems and methods begin with the identification of the upcoming branching portion of code depicted in FIG. 1 by the programmer, compiler, or processor at runtime. This identification is accomplished by the processor looking ahead to upcoming code, or the upcoming branching code is identified prior to runtime by the compiler. Once an upcoming branching portion is identified, a truth table is created to handle the upcoming branching portion. An exemplary truth table for the example branching portion depicted in FIG. 1 is shown in FIG. 10. The index columns correspond to the branching conditions to be calculated, and rows are added to the table for each possible combination of results for branching condition calculations. Thus, the first row corresponds to if 'a' is not less than 'b' and 'e' is not greater than 'f.' This relates to end condition 'w=s−t' depicted at result number 56 in FIG. 1. The index for 'c=d' is denoted with a 'd' for this row because this is a "do not care" condition. That is, regardless of whether 'c d.' if 'a' is not less than 'b' and 'e' is not greater than 'f,' the correct result will be 'w=s−t.' Similar logic can employed with reference to the branching portion depicted in FIG. 1 to develop the other rows of the truth table of FIG. 10.

Once an appropriate truth table is developed, it is loaded into the lookup table. Additionally, multiplexer connectivity may be accomplished at this time if multiplexers are used in the configuration. The multiplexer setup could be determined by the processor during runtime or by instructions coming from the programmer or compiler. The loading of the truth table into the lookup table and configuring of multiplexers is accomplished by the processor or by some other device.

Having the truth table loaded, the systems and methods are ready to compute the branching portion at the appropriate time. The first step in solving the branching portion is to compute all of the branching conditional statements. This may be done simultaneously in parallel utilizing the plurality of ALUs in the VLIW processor. Thus, in the current example, ALU0, ALU1, and ALU2 would simultaneously compute 'a<b'; 'c==d'; and 'e>f' and pass the Boolean results to the lookup table. During the next cycle, the ALUs would compute all of the possible results. Thus, during cycle 2, ALU0, ALU1, ALU2, and ALU3 would compute 'w=y+z; 'w=s+t'; w=y−z'; and 'w=s−t.'

While the possible results are calculating, the lookup table is outputting a selection signal to the guarded results registers' guard inputs to write the correct result to the register. For example, if 'a' is less than 'b' but 'c' is not equal to 'd,' then the third entry in the lookup table gives the correct result. Upon receipt of these condition signals following the branch condition processing in cycle 1, the lookup table outputs a selection signal to the guarded results register which would receive 'w=s+t' from the ALU. Once the guarded results register is validated by receiving a selection signal at its guard input, the proper result is permitted to be written to the register. Upon validation, these results may be passed to memory, retained in a register for further processing, communicated to other applications, or moved to other destinations depending on the following program code.

In a best case scenario, this branch processing can be accomplished in two processor cycles. The first calculates the branching conditions, and the second calculates the possible results. Following completion of these calculations, the processor can proceed with further work. The lookup table may be configured for the next upcoming branching portion or may retain its truth table if the branching portion of code is to be repeated. Repetition of similar or substantially similar branching portions is common in audio, graphic, and video processing such as JPEG2000, VC-3, VC-2, MC-FRC, De-Interlacing, Noise Reduction, and Detail Enhancement While examples have been used to disclose the invention, including the best mode, and also to enable any person skilled in the art to make and use the invention, the patentable scope of the invention is defined by claims, and may include other examples that occur to those skilled in the art. These variations could include the use of different logic in place of 'and' gates 220 to accommodate situations where the guarded results registers (206, 208, etc.) require active low signals or require application of the selection signal during different portions of a clock pulse. It is also within the scope of this disclosure to utilize 'and' gates 220 without multiplexers (216, 218, etc.) or without the register file 214 as well as other feature combinations.

Moreover, the fabrication of the elements of the disclosed apparatuses is not vital to the inventive aspects of the disclosure. Thus, The ALUs, operand register, and results registers could be fabricated on one chip while the lookup table, register file, multiplexers, and other logic are external to the processor. Additionally, all elements of the described apparatuses could be fabricated onto a single chip structure or any number of combinations of chip structures. The systems and methods disclosed are equally amenable to VLIW or superscalar architectures. Thus, it would be within the abilities of one skilled in the art to use the described system and methods utilizing a VLIW processor in a superscalar architecture. The systems and methods of this disclosure could be directed by the user during programming, by optimization logic in a compiler, or by processor intelligence during runtime. The examples depicted in the example embodiments should be considered illustrative and non-limiting.

We claim:

1. An apparatus for implementing a branch intensive algorithm, comprising:
    a processor comprising:
        a plurality of ALUs;
        a plurality of result registers, each result register being responsive to outputs of the plurality of ALUs;
        wherein the plurality of result registers each have a guard input that is responsive to a selection signal enabling the plurality of ALUs to write contents at a proper result register;
    a lookup table dynamically programmed with logic to implement a plurality of upcoming logic equations, the lookup table being responsive to outputs of the plurality of ALUs;
    wherein the lookup table outputs the selection signal(s) based upon outputs from the plurality of ALUs and the programmed logic for implementing the plurality of upcoming logic equations;
    wherein the branch intensive algorithm is selected from the group consisting of JPEG 2000, VC-3, VC-2, MC-FRC, De-Interlacing, Noise Reduction, and Detail Enhancement.

2. The apparatus of claim 1, further comprising a register file interposed between the plurality of ALUs and the lookup table to store outputs from the plurality of ALUs.

3. The apparatus of claim 1, further comprising a plurality of multiplexers interposed between the lookup table and each result register, such that each result register can be responsive to each selection signal output from the lookup table.

4. The apparatus of claim 3, further comprising an and gate interposed between each multiplexer and result register connection, the and gate being also responsive to a clock signal.

5. A method of efficiently processing a branch intensive algorithm comprising:
    configuring a lookup table with a truth table for an identified branching portion of the branch intensive algorithm;
    processing conditional statements of the identified branching portion in separate execution units of a processor;
    providing the outcomes of the conditional statement processing to the lookup table;
    processing possible results of the identified branching portion in separate pipelines of the processor;
    generating a selection signal from the lookup table based upon the configured truth table and outcomes of the conditional statement processing;
    providing the outputs of the results processing to guarded result registers;
    writing data in the guarded result register enabled by the selection signal; and
    configuring the lookup table with an appropriate truth table for the next identified branching portion;
    wherein the branch intensive algorithm is selected from the group consisting of JPEG 2000, VC-3, VC-2, MC-FRC, De-Interlacing, Noise Reduction, and Detail Enhancement.

6. The method of claim 5, further comprising storing the outcomes of the conditional statement processing in a register file before providing the outcomes of the conditional statement processing to the lookup table.

7. The method of claim 5, further comprising utilizing a multiplexer to map lookup table outputs to the guarded result registers.

8. The method of claim 5, wherein the processing of the conditional statements of the identified branching portion in separate pipelines of a VLIW processor is executed during a first clock cycle and;
    the processing of the possible results of the identified branching portion in separate pipelines of the VLIW processor is executed during a second clock cycle.

9. The method of claim 5, wherein the identified branching portion is identified by a compiler.

10. The method of claim 5, wherein the identified branching portion is identified by the programmer during coding.

11. The method of claim 10, wherein the configuring of the lookup table is completed before the identified branching portion is ready to be executed.

12. The method of claim 5, wherein the branch intensive algorithm involves video, audio, or graphic processing.

13. An apparatus for efficiently implementing an audio, video, or graphic processing algorithm comprising:
    a VLIW processor comprising:
        a plurality of ALUs;
        a plurality of result registers, each result register being responsive to outputs of the plurality of ALUs;
        wherein the plurality of result registers each have a guard input;
        wherein the guard inputs of the plurality of result registers are responsive to a selection signal enabling the plurality of ALUs to write contents at a proper result register;
    a register file responsive to outputs of the plurality of ALUs to store outputs from the plurality of ALUs;
    a lookup table dynamically programmed with logic to implement a plurality of upcoming logic equations, the lookup table being responsive to the register file;
    wherein the lookup table outputs the selection signals based upon outputs from the plurality of ALUs and the programmed logic for implementing the plurality of upcoming logic equations;
    wherein the processing algorithm is selected from the group consisting of JPEG 2000, VC-3, VC-2, MC-FRC, De-Interlacing, Noise Reduction, and Detail Enhancement.

14. The apparatus of claim 13, further comprising a plurality of a multiplexers interposed between the lookup table and each result register, such that each result register can be responsive to each selection signal output from the lookup table.

15. The apparatus of claim 14, further comprising an and gate interposed between each multiplexer and result register connection, the and gate being also responsive to a clock signal.

* * * * *